Patented July 1, 1952

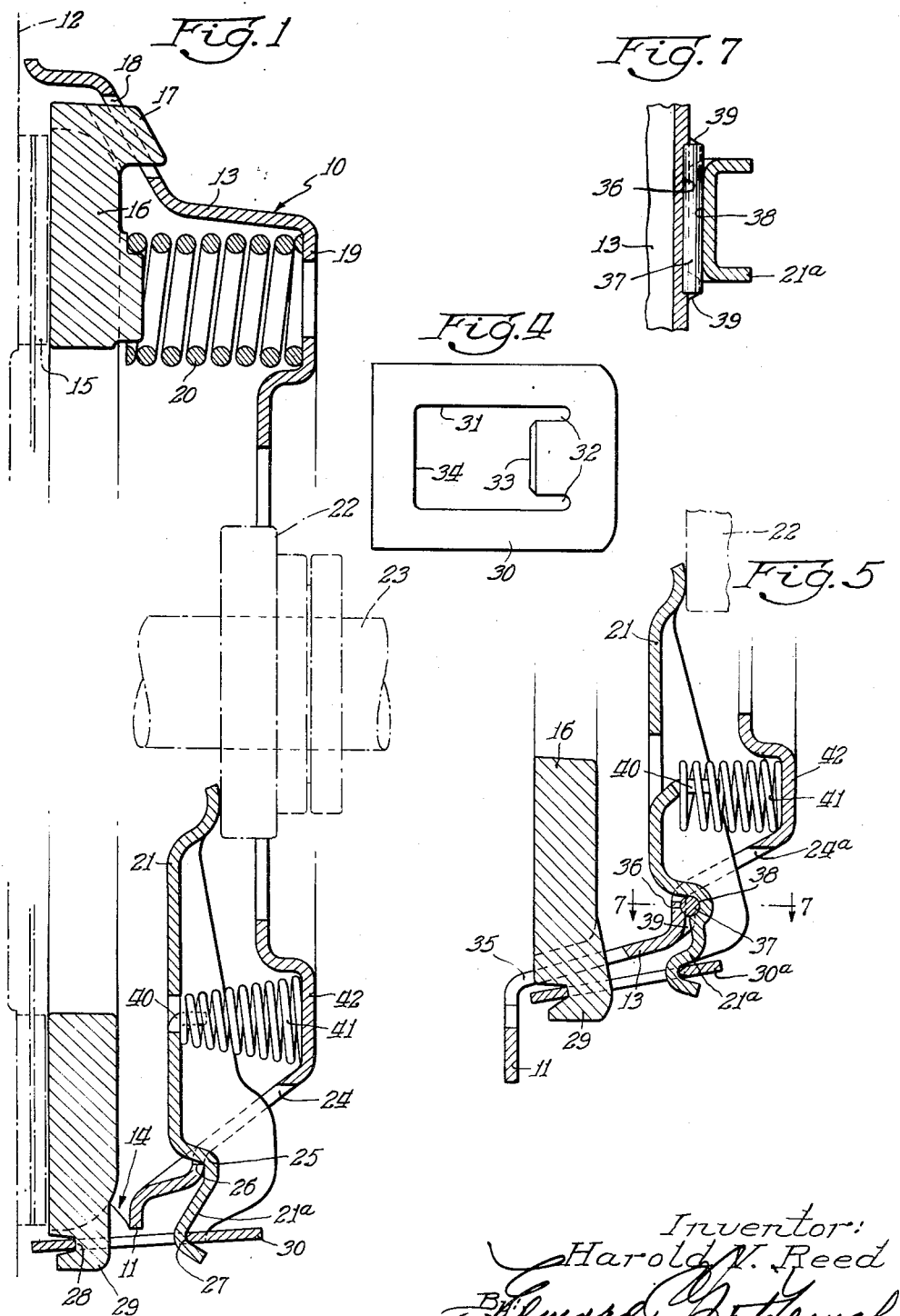

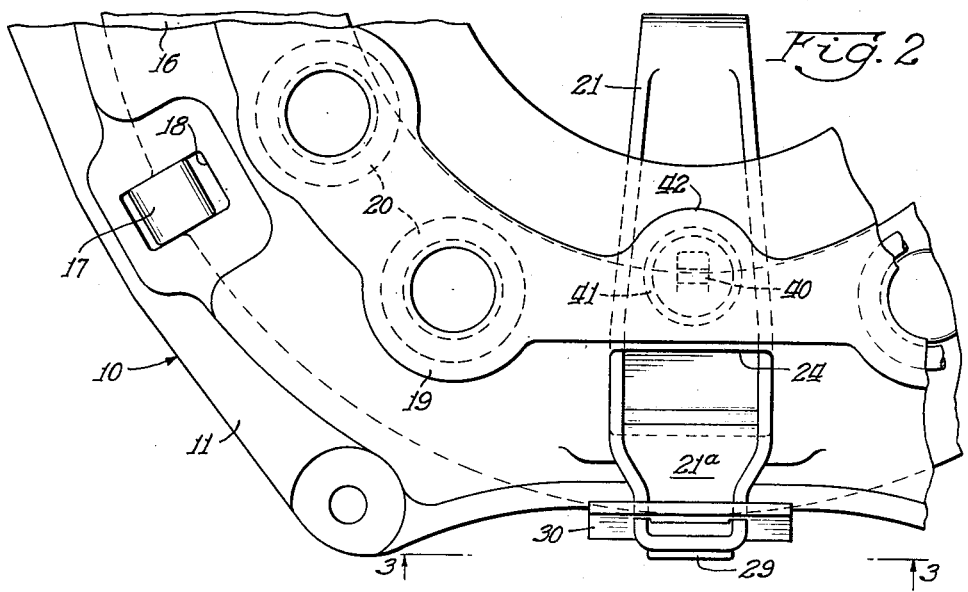
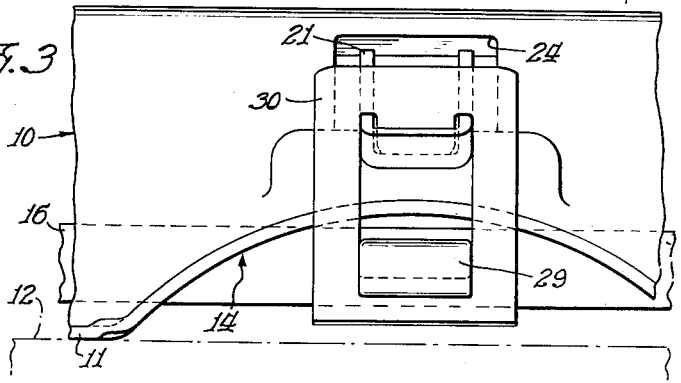
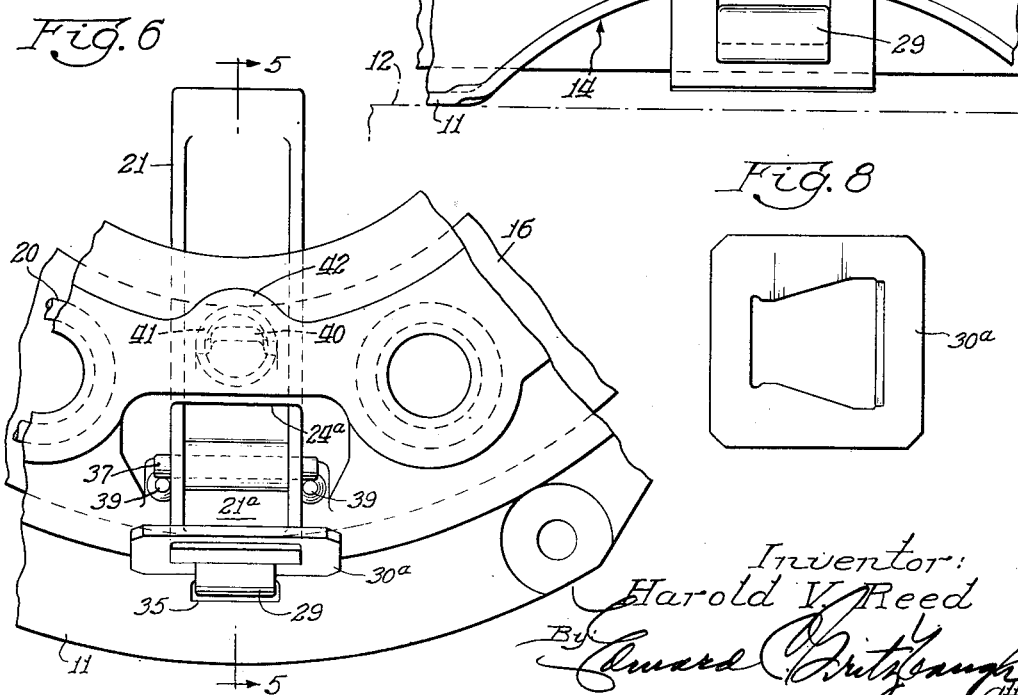
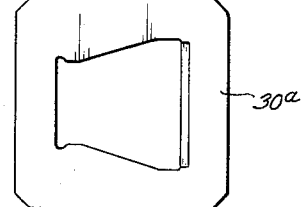

2,601,912

UNITED STATES PATENT OFFICE 2,601,912

CLUTCH ASSEMBLY

Harold V. Reed, Chicago, Ill., assignor to Borg-Warner Corporation, Chicago, Ill., a corporation of Illinois Application June 14, 1947, Serial No. 754,634

7 Claims. (Cl. 192—99)

The present invention relates generally to friction clutches, and has special reference to a novel arrangement of the release levers, the cover, and the pressure plate of a clutch of this character.

It is one of the principal objects of this invention to simplify the construction of a clutch assembly such as contemplated herein, and to improve the efficiency, operation and dependability of such clutch assembly.

Another principal object is to provide an arrangement wherein the axial dimensions of a clutch assembly are reduced by mounting the release levers within the confines of the cover, and by providing link connections between the radially outer portions of the release levers and the pressure plate.

A further object of the present invention resides in providing a clutch assembly wherein the release levers, which are positioned within the cover, have their outer ends or foot portions projecting through openings in the cover wall and are fulcrumed on the margins of such openings. In an alternative arrangement, shown in Figs. 5, 6 and 7, the lever fulcrum comprises a pivot pin 37 having a fixed position on the cover 10 by reason of the fact that said pivot pin is received and fits in concave seats 36 and 38 respectively in the lever 21 and at the edge of the cover opening through which the lever foot portion 21a projects so that there is no bodily rolling movement of the pivot pin during movement of the lever.

Other objects, aims and advantages of the present improvements will be apparent to persons skilled in the art after the construction and arragement of the clutch assembly is understood from the within description. It is preferred to accomplish the numerous objects hereof, and to practice the invention, in substantially the manner hereinafter fully described and as more particularly pointed out in the appended claims. Reference is made to the accompanying drawings which form a part of this specification.

In the drawings:

Fig. 1 is a sectional view taken axially through a clutch assembly showing the present improvements incorporated therein;

Fig. 2 is a fragmentary view in elevation disclosing details of the lower portions of the structure shown in Fig. 1;

Fig. 3 is an edge or side elevation of a portion of the structure shown in Fig. 2, the same being viewed from the plane of line 3—3 on Fig. 2;

Fig. 4 is a detail plan view of the link member which connects the release lever and pressure plate shown in Fig. 1;

Fig. 5 is a sectional view, similar to the lower portion of Fig. 1, and showing a modified arrangement, the view being along the plane of line 5—5 on Fig. 6;

Fig. 6 is an elevational view of the arrangement shown in Fig. 5;

Fig. 7 is a transverse section taken along the plane of line 7—7 on Fig. 5; and, Fig. 8 is a detail plan of the force transmitting link employed in the structure shown in Fig. 5.

The drawings are to be understood as being more or less of a diagrammatic character for the purpose of disclosing typical or preferred forms of the present improvements. In these drawings like reference characters identify the same parts in the different views.

Referring first to the clutch structure shown in Figs. 1 to 4, inclusive, and particularly referring to Fig. 1, the assembly comprises a clutch cover 10, formed preferably of sheet metal, and having a radial basal flange 11 which is anchored by bolts, not shown, to the driving member or flywheel 12. As seen in Fig. 1, the cover has an annular side wall 13, preferably inclined to the plane of the flange 11, and there are arched regions 14 along which said flange 11 continues, as clearly indicated in Figs. 2 and 3.

The driven friction plate 15 is pressed against the face of flywheel 12 by a spring-packed pressure plate 16 which has lugs 17 adjacent its outer margin which are engaged in "lanced" openings 18 in cover wall 13 between the arched regions 14 of the cover. The radial portion of cover 10 has embossments 19 to receive force transmitting helical springs 20 which are interposed between the cover and the pressure plate 16 to pack said pressure plate toward the driven plate 15 to effect engagement of the clutch plate against the flywheel face 12.

The release levers 21 preferably comprise metal stampings, the major portions of which have U-shape cross-section for rigidity, and are arranged with their inner ends in the path of the thrust bearing 22 which slides on the driven shaft 23. The radially outer or foot portions 21a of release levers 21 are of irregular shape in longitudinal section as shown in detail in Fig. 1, wherein it will be noted that these foot portions 21a pass through "lanced" openings 24 in the side wall of the cover radially inward of arched portions 14.

Angular or concave recesses 25 are formed in the surfaces of the release levers which face toward the pressure plate, and said recesses fulcrum on the radially outer edges 26 of openings 24, thus providing fixed line contacts at the fulcrums of said levers. Beyond these fulcrums, the radially outer ends or foot portions 21a of the release levers 21 have concave recesses 27 which face opposite to and approximately axially aline with recesses 28 in ears 29 projecting radially from the pressure plate 16 through the arched openings 14.

For the purpose of transmitting force from the levers 21 to the pressure plate 16, in opposition to the action of the spring means 20, suitable links 30, shown in detail in Fig. 4, are employed. These links 30 are preferably sheet metal stampings of generally rectangular contour having a central aperture 31 with parallel slots 32 extending into the body of the links at an end portion thereof to provide fulcrum tongues 30a. The free inner edges 33 of the tongues have chisel-like sections to engage in the concave recesses 27 of the release levers 21. The edge portions 34 of the links opposite the tongues are seated in the concave recesses 28 on the pressure plate. Thus, when thrust bearing 22 is shifted to the left, Fig. 1, the outer foot portions 21a of the release levers will be moved in directions to transmit force to links 30 and thereby withdraw the pressure plate from contact with the driven friction plate 15 for effecting release of the clutch.

In the arrangement shown in Figs. 5 to 8, inclusive, the arched regions 14 of the cover are dispensed with, and in lieu thereof, the inclined sides of the cover have a plurality of openings 35 which extend away from the attaching base flange 11, through which openings the radial ears 29 of the pressure plate 16 protrude, as shown in Fig. 5. Also "lanced" openings 24a are made in the cover side wall similar to the arrangement shown in Fig. 1. The radially outer edges of openings 24a have coined concave seats 36 to receive cylindrical pivot pins 37 which provide the fulcrums for release levers 21. These release levers also have coined concave seats 38 in their foot portions 21a which receive the pivot pins 37, thus providing an easy acting fulcrum for the release levers.

The links 30a in the modified arrangement are generally similar in construction and function to the links 30 which are employed in the first-described form and are engaged in concave recesses in the pressure plate lugs 29 and the lever foot portions 21a. In order to assist in maintaining the fulcrum rollers 37 in concave seats, small embossments 39 protrude from the outside face of the cover wall adjacent the concave seats 36 for the rollers.

In both forms of the clutch structures shown herein the release levers 21 have lateral retainer lips 40 on their inner portions, which lips enter adjacent ends of helical springs 41. The other ends of these springs are received in embossments 42 on the cover 10. Springs 41 thus yieldably urge the radially inner portions of release levers 21 toward pressure plate 16 and maintain the links in assembly with the pressure plate ears and the foot portions of the release levers. Furthermore, the means which fulcrum the levers at the edges of the cover openings are of a fixed character so that there is no bodily movement of the levers in a direction radially of the assembly as would be incident to the use of a cylindrical fulcrum member which has a rolling contact upon a flat surface region of the cover adjacent the lever-receiving opening in said cover.

While this invention has been described in its present preferred forms or embodiments, it will be apparent to persons skilled in the art, after understanding the construction and operation thereof, that numerous changes may be made therein without departing from the spirit or scope thereof. It is contemplated in the appended claims to cover all such changes and modifications.

What is claimed is:

1. In a friction clutch, a pressure plate; spring means urging said plate in one direction; a cover surrounding said plate and spring means, said cover having a radial base flange and a side wall at an angle to said flange, said side wall being provided with a first opening adjacent said flange and a second opening radially inward from said flange; a release lever within said cover adjacent said pressure plate, said lever having a radially outer end portion projecting through said second cover opening; a concave seat on the outer surface of said cover at a margin of said second opening; a concave seat on said lever facing said cover seat; a pivot pin engaged in said seats providing fulcrum means for said lever; a link member transmitting force from said lever to said pressure plate against the action of said spring means; and a lug on said pressure plate engaged in said first cover opening for establishing a driving connection between said cover and pressure plate.

2. A clutch assembly comprising a clutch cover having a side wall extending in a generally axial direction with an opening therein; a pressure plate within said cover; a radial lug on said pressure plate projecting outside said cover adjacent said opening; spring means urging said pressure plate in one direction; release lever means within said cover and movable in opposition to said spring means, said lever means having therein a concave recess seated at the radially outer edge of said cover opening to fulcrum said lever; a foot forming a portion of said lever means which projects radially outward beyond said lever fulcrum; a movement transmitting floating link operatively connecting said pressure plate and said lever, said link having spaced fulcrum edges; a recess in said pressure plate lug in which a first of said link fulcrum edges is seated; and a recess in said lever foot in which a second of said link fulcrum edges is seated, said lever means projecting through said cover opening, the components of said assembly having cooperative association with each other to define a clutch mechanism which is particularly characterized by its restricted axial dimensions.

3. A clutch assembly comprising a dished cover having an obliquely extending side wall with openings therein; a pressure plate within said cover; radial lugs on said pressure plate projecting beyond said cover adjacent said openings; levers movable within said cover for moving said pressure plate to release said clutch, said levers having therein concave recesses seated at the radially outer edges of said cover openings to fulcrum said levers; foot portions on said levers projecting radially outward from said cover openings beyond the respective lever fulcrums; movement transmitting floating links operatively connecting said pressure plate and said levers, said links having spaced fulcrum edges; recesses in said pressure plate lugs in which the first of said link fulcrum edges are seated; and recesses in said lever foot portions in which the second of said link fulcrum edges are seated, the components of said assembly being in cooperative association with each other to define a clutch mechanism which is particularly characterized by its restricted axial dimensions.

4. A clutch assembly comprising a dished cover having a side wall extending in a generally axial direction with openings therein; a pressure plate housed in said cover; radial lugs on said pressure plate projecting outside said cover adjacent said openings; release levers having their major portions housed within said cover and fulcrumed at the radially outer edges of said cover openings and having their outer end regions projecting radially outside said cover; and floating links each comprising a metal plate having an aperture therein with straight opposite end margins, one of said margins defining a first fulcrum edge seated on a pressure plate lug, and the other margin having slotted ends providing a tongue projecting toward the first margin and defining a second fulcrum edge which is engaged in said lever end region.

5. In a friction clutch, a pressure plate; spring means urging said plate in one direction; a cover surrounding said plate and spring means; a release lever between said cover and said pressure plate, said lever having a radially outer end portion projecting through said cover in non-contacting relation thereto; a concave seat extending into the outer surface of said cover adjacent said lever end portion; a concave seat on said lever end portion facing said cover seat; a pivot pin mounted in said seats providing fulcrum means for said lever; outwardly protruding retainer bosses at the margins of the cover seat for arresting dislodgement of the pivot pin; and a link member transmitting force from the outer end portion of said lever to said pressure plate against the action of said spring means.

6. In a friction clutch, a pressure plate; spring means urging said plate in one direction; a dished cover surrounding said plate and spring means, said cover having an opening in a side wall thereof; a release lever between said cover and pressure plate and having a radially outer end portion projecting through said cover opening in non-contacting relation to the edges of said opening; a concave seat extending into the outer surface of said cover at the radially outer edge of said opening; a concave seat on said outer end portion of the lever and facing said cover seat; a pivot pin engaged in said seats providing fulcrum means for said lever; means on said cover adjacent the concave seat and close to the ends of said pivot pin maintaining said pin against dislodgement; and a link member transmitting force from said lever to said pressure plate in opposition to said spring means.

7. In a friction clutch which includes a pressure plate; spring means urging said pressure plate in a clutch-engaging direction; a clutch cover enclosing said pressure plate and springs and having driving connection with said pressure plate; and a plurality of levers within said cover and fulcrumed thereon for moving said pressure plate in a clutch-releasing direction in opposition to said springs, those improvements which comprise a foot portion on said lever extending radially outwardly through an opening in the clutch cover, each lever having radially spaced first and second recesses, said first recess contacting an edge of the cover opening to fulcrum the lever; and a floating link connecting the foot portion of the lever to said pressure plate, said link having a first edge in rocking engagement with said second recess on the lever foot portion and having a second edge in rocking engagement with means on the pressure plate extending outwardly through the clutch cover.

HAROLD V. REED.

REFERENCES CITED

The following references are of record in the file of this patent:

UNITED STATES PATENTS

| Number | Name | Date |
| --- | --- | --- |
| 1,978,922 | Wemp | Oct. 30, 1934 |
| 2,002,943 | Hartley | May 28, 1935 |
| 2,017,915 | Moorhouse | Oct. 22, 1935 |
| 2,038,017 | Wemp | Apr. 21, 1936 |
| 2,101,293 | Reed | Dec. 7, 1937 |
| 2,217,078 | Reed | Oct. 8, 1940 |
| 2,417,035 | Zeidler | May 4, 1947 |